(12) United States Patent
Hayes et al.

(10) Patent No.: US 11,811,441 B2
(45) Date of Patent: *Nov. 7, 2023

(54) INTERFERENCE MITIGATION BASED ON ANTENNA SYSTEM PHASE DISTRIBUTION

(71) Applicant: SMARTSKY NETWORKS LLC, Morrisville, NC (US)

(72) Inventors: Gerard James Hayes, Wake Forest, NC (US); Elbert Stanford Eskridge, Jr., Chapel Hill, NC (US); Koichiro Takamizawa, Cary, NC (US); John Swartz, Wake Forest, NC (US); Mike Barts, Wake Forest, NC (US); James Legvold, Willow Park, TX (US)

(73) Assignee: SMARTSKY NETWORKS LLC, Morrisville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,869

(22) Filed: Jan. 7, 2022

(65) Prior Publication Data
US 2022/0131564 A1 Apr. 28, 2022

Related U.S. Application Data

(63) Continuation of application No. 16/954,740, filed as application No. PCT/US2018/066125 on Dec. 18, 2018, now Pat. No. 11,233,534.
(Continued)

(51) Int. Cl.
*H04B 1/12* (2006.01)
*H04B 7/185* (2006.01)

(52) U.S. Cl.
CPC ......... *H04B 1/123* (2013.01); *H04B 7/18506* (2013.01)

(58) Field of Classification Search
CPC .... H04B 1/123; H04B 7/18506; H04B 7/185; H04B 7/18519; H04B 7/21; H04B 7/345
See application file for complete search history.

(56) References Cited

U.S. PATENT DOCUMENTS

| 2016/0112111 A1 | 4/2016 | Bull |
| 2017/0264326 A1 | 9/2017 | Eskridge, Jr. et al. |

(Continued)

FOREIGN PATENT DOCUMENTS

| JP | 2011019067 A | 1/2011 |
| JP | 2012217192 A | 11/2012 |

(Continued)

OTHER PUBLICATIONS

Notice of Reasons for Rejection from corresponding Japanese Application No. 2020-533607 dated Dec. 13, 2022, all enclosed pages cited.

(Continued)

*Primary Examiner* — Nguyen T Vo
(74) *Attorney, Agent, or Firm* — Burr & Forman LLP (57) ABSTRACT

A method of interference mitigation may include receiving a desired signal from an asset of the system at an antenna assembly and associating the desired signal with relative phase distribution information based on a relative location of origin of the desired signal where the relative phase distribution information is predetermined for the antenna assembly. The method further includes receiving an interfering signal and associating the interfering signal with relative phase distribution information based on a relative location of origin of the interfering signal where the desired signal and the interfering signal forming a received signal set. The method further includes normalizing signals of the received signal set to respective relative phases associated with each respective relative location of origin, and performing inter- (Continued)

ference cancellation of the interfering signal based on the normalized signals.

20 Claims, 6 Drawing Sheets

Related U.S. Application Data (60) Provisional application No. 62/607,569, filed on Dec. 19, 2017.

(56) References Cited

U.S. PATENT DOCUMENTS

| | | |
|---|---|---|
| 2017/0353864 A1 | 12/2017 | Bull |
| 2019/0086683 A1 | 3/2019 | Aieta et al. |
| 2021/0126377 A1 | 4/2021 | Kim et al. |
| 2021/0126669 A1* | 4/2021 | Roberts ................. H04L 5/0023 |
| 2021/0280972 A1 | 9/2021 | Behdad et al. |
| 2022/0059941 A1* | 2/2022 | Timofeev ............... H01Q 19/06 |
| 2022/0069927 A1* | 3/2022 | Abdelmonem ........ H01Q 1/002 |
| 2022/0344826 A1* | 10/2022 | Chowdhury ........... H01Q 19/18 |

FOREIGN PATENT DOCUMENTS

| | | |
|---|---|---|
| JP | 2016522997 A | 8/2016 |
| WO | 9923718 A1 | 5/1999 |
| WO | 2013062085 A1 | 5/2013 |

OTHER PUBLICATIONS

International Search Report and Written Opinion from International Application No. PCT/US2018/066125 dated Mar. 21, 2019, all pages cited in its entirety.

Notice of Decision to Grant from corresponding Korean Application No. 10-2020-7020903 dated May 23, 2023, all enclosed pages cited.

* cited by examiner

INTERFERENCE MITIGATION BASED ON ANTENNA SYSTEM PHASE DISTRIBUTION

CROSS REFERENCE TO RELATED APPLICATIONS

This application is the continuation of U.S. application Ser. No. 16/954,740 filed on Jun. 17, 2020 which is the U.S. national phase of international application number PCT/US2018/066125 filed on Dec. 18, 2018 which claims priority to U.S. application No. 62/607,569 filed on Dec. 19, 2017, the entire contents of which are hereby incorporated by reference in its entirety.

TECHNICAL FIELD

Example embodiments generally relate to wireless communications and, more particularly, relate to interference mitigation techniques for wireless air-to-ground (ATG) networks.

BACKGROUND

High speed data communications and the devices that enable such communications have become ubiquitous in modern society. These devices make many users capable of maintaining nearly continuous connectivity to the Internet and other communication networks. Although these high speed data connections are available through telephone lines, cable modems or other such devices that have a physical wired connection, wireless connections have revolutionized our ability to stay connected without sacrificing mobility.

However, in spite of the familiarity that people have with remaining continuously connected to networks while on the ground, people generally understand that easy and/or cheap connectivity will tend to stop once an aircraft is boarded. Aviation platforms have still not become easily and cheaply connected to communication networks, at least for the passengers onboard. Attempts to stay connected in the air are typically costly and have bandwidth limitations or high latency problems. Moreover, passengers willing to deal with the expense and issues presented by aircraft communication capabilities are often limited to very specific communication modes that are supported by the rigid communication architecture provided on the aircraft.

As improvements are made to network infrastructures to enable better communications with in-flight receiving devices of various kinds, it is expected that more solutions will be put in place to try to alleviate the problems discussed above. The existence of competing solutions, and just the general scarcity of spectrum that may be associated with any particular communication solution, may cause the likelihood and impact of interference to increase. Accordingly, it may be desirable to define highly capable solutions for mitigating interference in this unique and very challenging communication environment.

BRIEF SUMMARY OF SOME EXAMPLES

The continuous advancement of wireless technologies offers new opportunities to provide wireless coverage for aircraft in-flight. Some example embodiments may provide interference mitigation techniques that may, for example, be implemented on aircraft antennas to improve their performance. For example, some embodiments may allow a priori knowledge of antenna system phase distribution to be used in connection with employing a near real time capability to perform interference mitigation.

In one example embodiment, an interference mitigation module may be provided. The module may include processing circuitry configured to receive a desired signal from an asset of the system at an antenna assembly and associate the desired signal with relative phase distribution information based on a relative location of origin of the desired signal where the relative phase distribution information is predetermined for the antenna assembly. The processing circuitry may be further configured to receive an interfering signal and associate the interfering signal with relative phase distribution information based on a relative location of origin of the interfering signal where the desired signal and the interfering signal forming a received signal set. The processing circuitry may be further configured to normalize signals of the received signal set to respective relative phases associated with each respective relative location of origin, and perform interference cancellation of the interfering signal based on the normalized signals.

In another example embodiment, a method of interference mitigation may be provided. The method may include receiving a desired signal from an asset of the system at an antenna assembly and associating the desired signal with relative phase distribution information based on a relative location of origin of the desired signal where the relative phase distribution information is predetermined for the antenna assembly. The method further includes receiving an interfering signal and associating the interfering signal with relative phase distribution information based on a relative location of origin of the interfering signal where the desired signal and the interfering signal forming a received signal set. The method further includes normalizing signals of the received signal set to respective relative phases associated with each respective relative location of origin, and performing interference cancellation of the interfering signal based on the normalized signals.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals may be used to refer to like elements throughout. Furthermore, as used herein, the term "or" is to be interpreted as a logical operator that results in true whenever one or more of its operands are true.

As used in herein, the terms "component," "module," and the like are intended to include a computer-related entity, such as but not limited to hardware, firmware, or a combination of hardware and software (i.e., hardware being configured in a particular way by software being executed thereon). For example, a component or module may be, but is not limited to being, a process running on a processor, a processor (or processors), an object, an executable, a thread of execution, and/or a computer. By way of example, both an application running on a computing device and/or the computing device can be a component or module. One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

Some example embodiments described herein provide strategies for improved air-to-ground (ATG) wireless communication performance. In this regard, some example embodiments may provide improved interference mitigation techniques that can be applied to antennas on aircraft that communicate wirelessly with base stations on the ground. These interference mitigation techniques may be considered to be relatively complex and therefore are particularly useful in the context of ATG communication due to the challenges posed by such environments. However, it should be appreciated that the concepts described herein apply in any context in which antennas are used and interference mitigation is desirable. Thus, the descriptions herein relating to aircraft antennas should be appreciated as being merely descriptive of one context in which the computational loads and complexity of practicing example embodiments is known to be capable of meeting the complexity and challenges of the operating environment, and are not limiting to other contexts in which example embodiments may be applicable.

Figure 1:
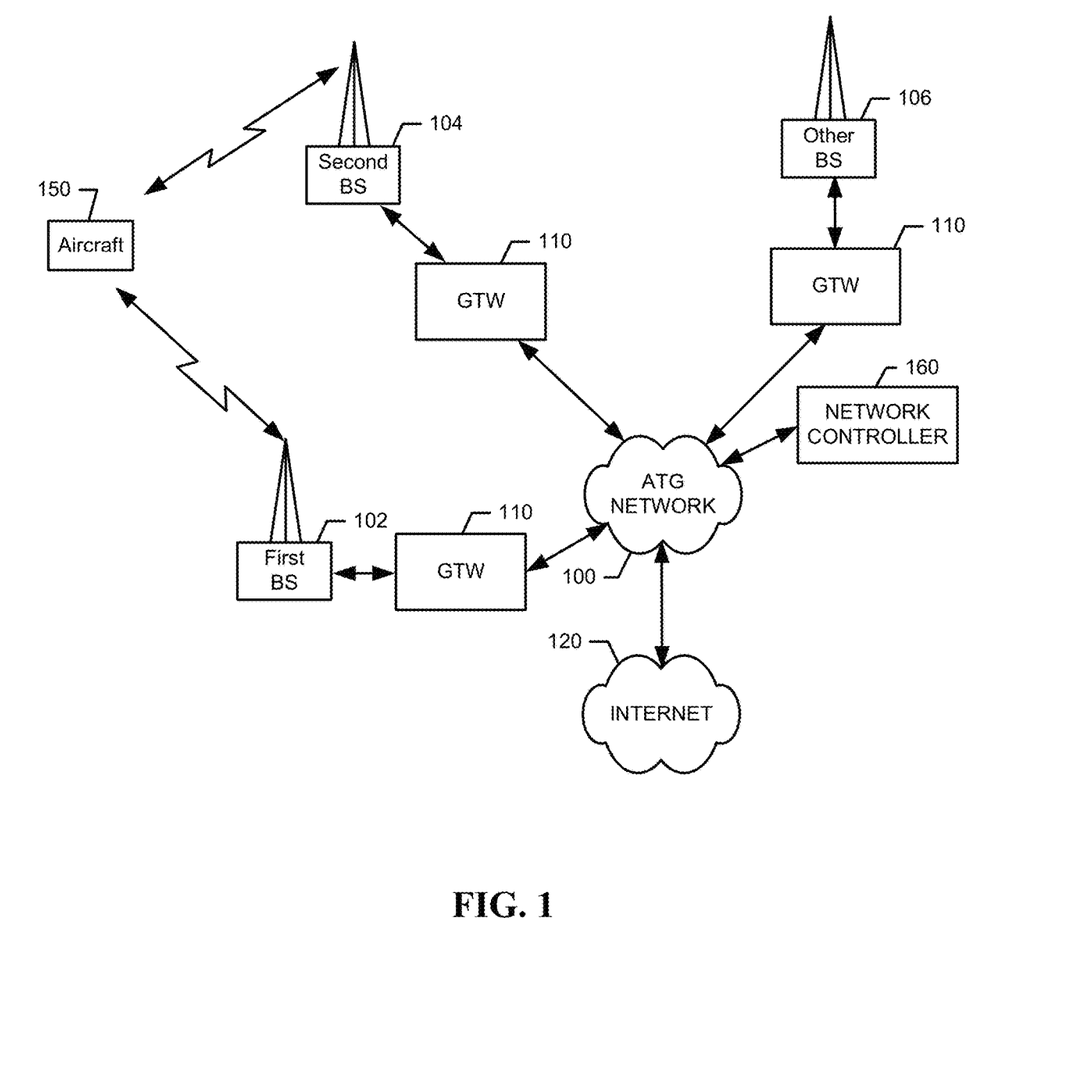
FIG. 1 illustrates a functional block diagram of an ATG communication network that may employ an example embodiment of interference mitigation.

FIG. 1 illustrates a functional block diagram of an ATG network 100 that may employ an example embodiment. As shown in FIG. 1, a first BS 102 and a second BS 104 may each be base stations of the ATG network 100. The ATG network 100 may further include other BSs 106, and each of the BSs may be in communication with the ATG network 100 via a gateway (GTW) device 110. The ATG network 100 may further be in communication with a wide area network such as the Internet 120 or other communication networks. In some embodiments, the ATG network 100 may include or otherwise be coupled to a packet-switched core network. It should also be understood that the first BS 102, the second BS 104 and any of the other BSs 106 may be either examples of base stations employing antennas configured to communicate via network frequencies and protocols defined for the ATG network 100 with an aircraft 150. The aircraft 150 may be in-flight and may move between coverage areas (defined in 3D space above the surface of the earth) that are associated with respective ones of the first BS 102, the second BS 104 and other BSs 106. These coverage areas may overlap such that continuous coverage can be defined and the aircraft 150 can sequentially communicate with various ones of the BSs as the aircraft 150 travels via handovers. In some cases, handovers of receivers on aircraft may be accomplished under the control of a network component such as network controller 160.

Although the network controller 160 is shown as being operably coupled to the ATG network 100 directly in FIG. 1, it should be appreciated that the network controller 160 could be located anywhere in the ATG network 100, and may even be a collection of distributed components in some cases. The network controller 160 that may include, for example, switching functionality. Thus, for example, the network controller 160 may be configured to handle routing calls to and from the aircraft 150 (or to communication equipment on the aircraft 150) and/or handle other data or communication transfers between the communication equipment on the aircraft 150 and the ATG network 100. In some embodiments, the network controller 160 may function to provide a connection to landline trunks when the communication equipment on the aircraft 150 is involved in a call. In addition, the network controller 160 may be configured for controlling the forwarding of messages and/or data to and from communication equipment on the aircraft 150, and may also control the forwarding of messages for the base stations. It should be noted that although the network controller 160 is shown in the system of FIG. 1, the network controller 160 is merely an exemplary network device and example embodiments are not limited to use in a network employing the network controller 160.

The network controller 160 may be coupled to a data network, such as a local area network (LAN), a metropolitan area network (MAN), and/or a wide area network (WAN) (e.g., the Internet 120) and may be directly or indirectly coupled to the data network. In turn, devices such as processing elements (e.g., personal computers, laptop computers, smartphones, server computers or the like) can be coupled to the communication equipment on the aircraft 150 via the Internet 120.

Although not every element of every possible embodiment of the ATG network 100 is shown and described herein, it should be appreciated that the communication equipment on the aircraft 150 may be coupled to one or more of any of a number of different networks through the ATG network 100. In this regard, the network(s) can be capable of supporting communication in accordance with any one or more of a number of first-generation (1G), second-generation (2G), third-generation (3G), fourth-generation (4G) and/or future mobile communication protocols or the like. In some cases, the communication supported may employ communication links defined using unlicensed band frequencies such as 2.4 GHz or 5.8 GHz. Example embodiments may employ time division duplex (TDD), frequency division duplex (FDD), or any other suitable mechanisms for enabling two way communication (to and from the aircraft 150) within the system. Moreover, in some cases, this communication may be accomplished, and one or both of the links associated therewith may be formed, via narrow radio frequency beams that are formed or otherwise resolved by the antenna assemblies associated with the aircraft 150 and/or the base stations (102, 104, 106). As such, beamforming technology may be used to define one or both of the uplink to the aircraft 150 and the downlink from the aircraft 150.

In some embodiments, one or more instances of a beamforming control module may be employed on wireless communication equipment at either or both of the network side or the aircraft side in example embodiments. Thus, in some embodiments, the beamforming control module may be implemented in a receiving station on the aircraft 150 (e.g., a passenger device or device associated with the aircraft's communication system (e.g., a WiFi router)). In some embodiments, the beamforming control module may be implemented in the network controller 160 or at some other network side entity. The beamforming control module may be configured to utilize location information (e.g., indicative of a relative location of the aircraft 150 from one of the base stations) to steer or form a narrow beam toward the target (e.g., the aircraft 150) from the transmitting entity (e.g., the first BS 102). The narrow beam may then reach the target (e.g., the aircraft 150) at an angle of arrival (in 3D space) determined by the relative location.

Figure 2:
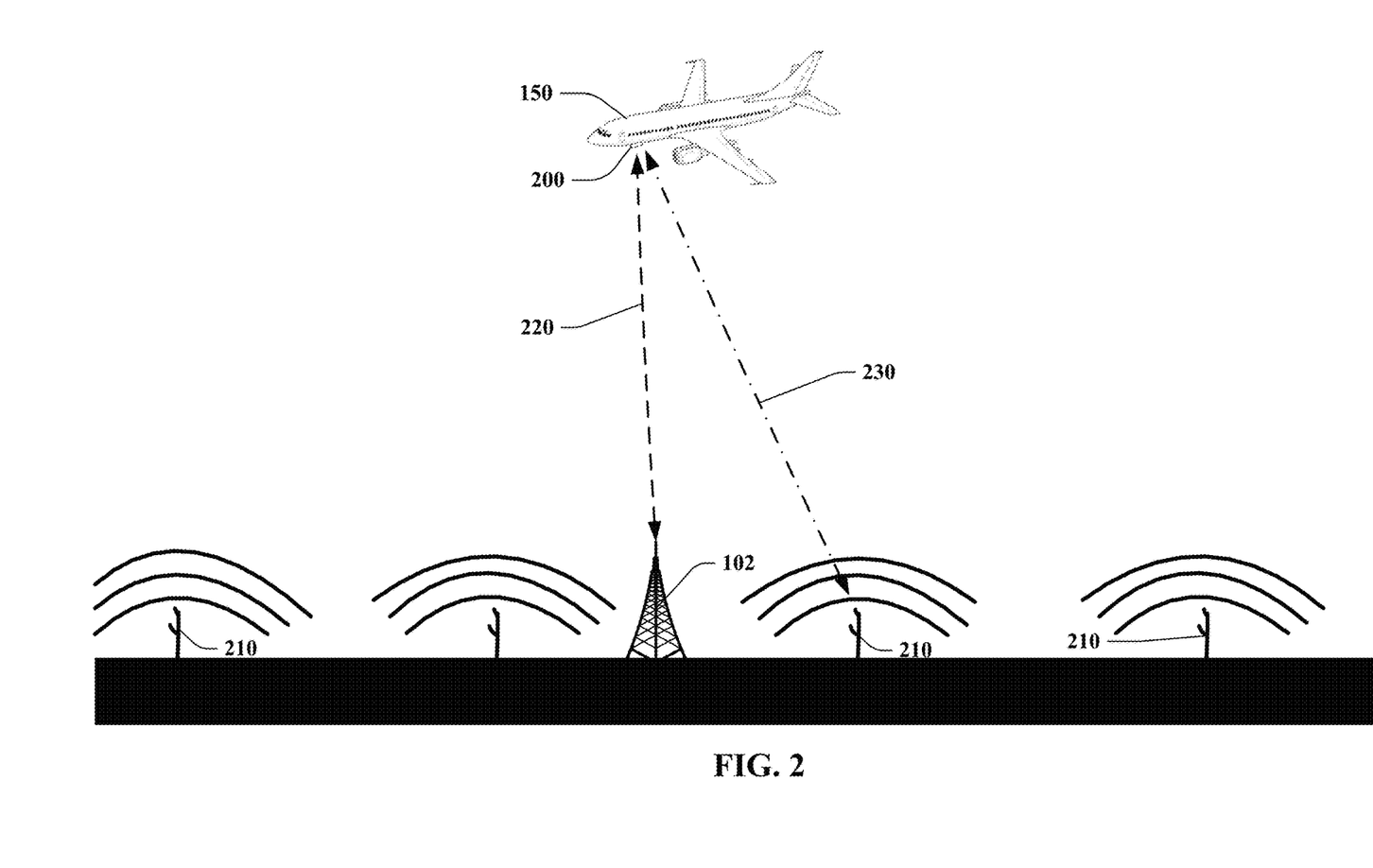
FIG. 2 illustrates a side view of an aircraft receiving a desired signal and interfering signal in accordance with an example embodiment.

FIG. 2 is an illustration of a side view of a wireless communication environment in accordance with an example embodiment. As shown in FIG. 2, the aircraft 150 (i.e., an in-flight aircraft) may be flying overhead at any achievable elevation. The aircraft 150 may have at least one antenna assembly 200 disposed at a portion thereof. In this example, the antenna assembly 200 may be disposed at a bottom portion of the fuselage of the aircraft 150. However, it should be appreciated that the antenna assembly 200 could alternatively be located at other positions, and other antenna assemblies could also be included on the aircraft 150.

Although only one ATG base station (i.e., first BS 102) is shown in FIG. 1, it should be appreciated that a plurality of such base stations may be distributed to have overlapping coverage areas to define the ATG network 100 as described above. Thus, as the aircraft 150 moves relative to the surface of the earth, the aircraft 150 (or communication equipment thereon) can sequentially be handed off between various ones of the ATG base stations.

At various locations on the surface of the earth, interfering transmitters 210 may be located, and the interfering transmitters 210 may transmit in all or distinct directions, any of a number of different signals at discrete or wideband frequencies that may or may not overlap with the frequencies that the communication equipment on the aircraft 150 and the base stations of the ATG network 100 use to communicate. To the extent there is any overlap in frequencies between the base stations of the ATG network 100 and the interfering transmitters 210, or to the extent that the frequencies of the interfering transmitters 210 impact the frequencies of the base stations (even without overlap), interference may be received at the aircraft 150 (or more particularly at the antenna assembly 200 of the aircraft 150).

As shown in FIG. 2, a desired signal 220 (e.g., associated with the uplink to the aircraft 150 from the first BS 102) may be incident upon the antenna assembly 200 at a given angle of arrival, and an interfering signal 230 may also be incident upon the antenna assembly 200 at another angle of arrival. In this example, and in many examples, the angles of arrival may be different and determinable. However, it should be appreciated that a number of interfering signals could also be received from other sources, so the interfering signal 230 is merely one example and each other instance of an interfering signal may also have its own angle of arrival that is also determinable. It should also be appreciated that the scenario depicted in FIG. 2 shows a two dimensional (2D) view of the differences in angle of arrival between the desired signal 220 and the interfering signal 230, but the angular difference actually exists also in 3D space.

Figure 3:
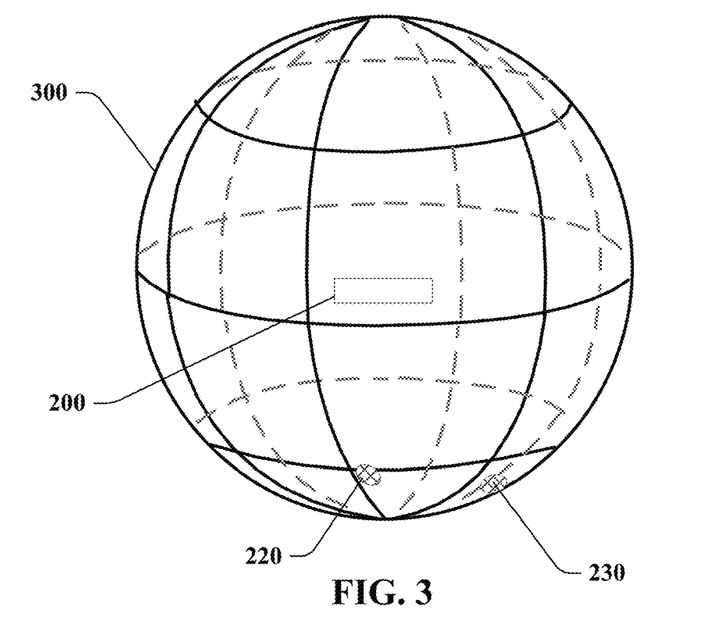
FIG. 3 illustrates a perspective view of an orientation reference sphere in accordance with an example embodiment.

To better conceptualize the actual difference in angle of arrival between the desired signal 220 and the interfering signal 230, consider FIG. 3. FIG. 3 illustrates an orientation reference sphere 300 superimposed over the antenna array 200, which is otherwise shown in isolation. The orientation reference sphere 300, which is a 3D object, provides a frame of reference for all possible angles of arrival to the antenna assembly 200 within 3D space. A point of intersection of the desired signal 220 with the orientation reference sphere 300 is therefore determinable and can be distinguished from a point of intersection of the interfering signal 230 with the orientation reference sphere 300. This ability to determine and distinguish the angle of arrival of signals can, of course, be used to apply interference cancellation techniques to the distinct area where the interfering signal 230 is known to be located. Example embodiments will, as described in greater detail below, define a mechanism by which to use this knowledge to great advantage in the context of interference mitigation in the challenging ATG environment, and do so in real time or near real time.

Figure 4:
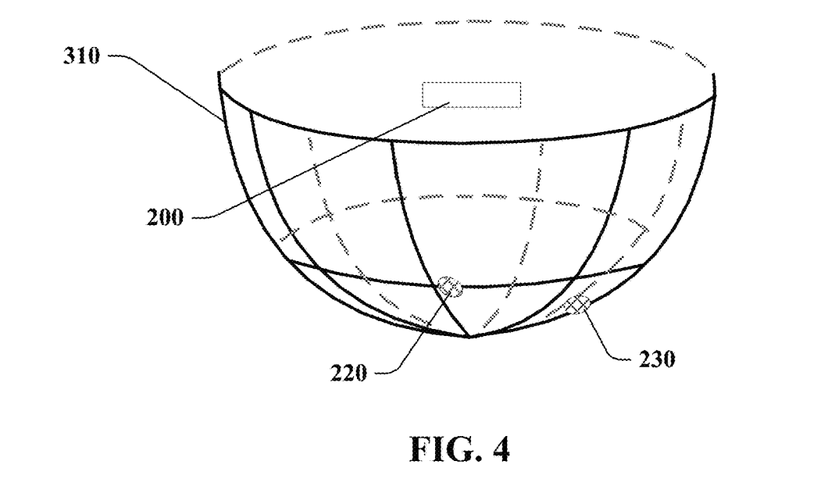
FIG. 4 illustrates a perspective view of an orientation reference hemisphere in accordance with an example embodiment.
Figure 5:
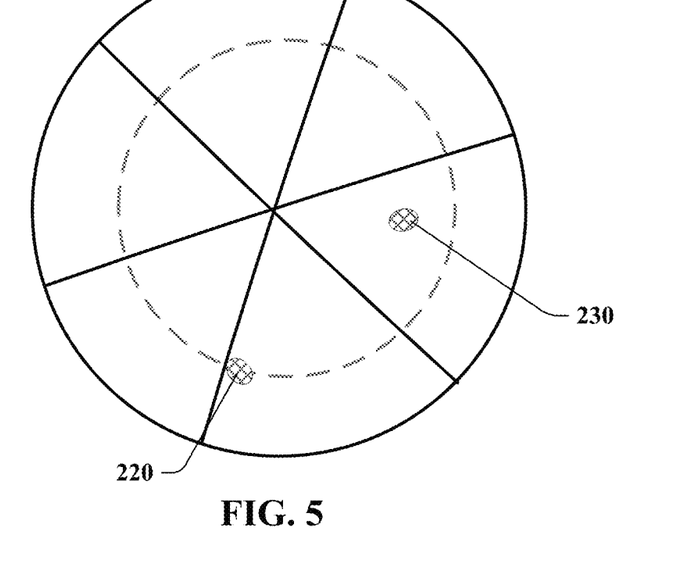
FIG. 5 illustrates a bottom view of the orientation reference hemisphere in accordance with an example embodiment.

For a generic antenna assembly, which could expect to receive the desired signal 220 from any location on the orientation reference sphere 300, it may necessary or prudent to consider the entire orientation reference sphere 300 as potential arrival locations where each arrival location corresponds to an angle of arrival mapped to the orientation reference sphere 300. However, for the antenna assembly of FIG. 2, it may be appreciated that the desired signal nearly always approaches the antenna assembly 200 from only one hemisphere (i.e., the bottom hemisphere that faces the earth). The fuselage of the aircraft 150 may also shield the antenna assembly 200 from possible interference from above. Thus, the orientation reference sphere 300 could be replaced with an orientation reference hemisphere 310, as shown in FIGS. 4 and 5. In this regard, FIG. 4 is a perspective, side view of the orientation reference hemisphere 310 and FIG. 5 is a top view of the orientation reference hemisphere 310. A point of intersection of the desired signal 220 with the orientation reference hemisphere 310 is therefore determinable and can be distinguished from a point of intersection of the interfering signal 230 with the orientation reference hemisphere 300.

Knowing the location of the interfering signal 230 with respect to a reference of some sort can, as mentioned above, enable signal processing techniques to be applied relative to the known location. However, as also mentioned above, doing so in an ATG context can be very challenging. This challenge is, at least in part, due to the high speeds that aircraft travel (e.g., 450 mph or more). As a result of the high speeds that aircraft, like the aircraft 150 of FIGS. 1 and 2, can achieve, the relative characteristics (e.g., amplitude, phase, and angle of arrival) of the desired signal 220 can rotate through massive amounts of phase angle in very short times. For example, at 450 mph, a 2.4 GHz signal can rotate through 579 degrees of phase in one millisecond.

Conventionally, interference mitigation techniques can be applied in the radio frequency (RF) domain or the baseband domain. For example, an interference mitigation technique in the RF domain may include the intentional manipulation of the antenna radiation pattern (such as the positioning of a null in the antenna amplitude pattern in the direction of an identified interfering signal). These nulls can be fixed (using hardware), dynamic (using software controls), or a combination of the two.

Mathematically, a signal can be cancelled by applying a similar signal (in amplitude) that has been inverted (e.g. shifted by 180 degrees). As a result, when an interfering signal is identified from a set of received signals (including a desired, intentional signal and the interfering signal), the interfering signal can be inverted and added back to the set of received signals (or "received signal set"). As a result, the inverted interfering signal cancels the received interfering signal and is "removed" from the received signal set. The inversion process may be realized physically in the RF domain (using phase shifters and combiners) or digitally in the baseband domain (using software defined manipulation of the I and Q components of the signal). With the advent of software defined radios (SDRs) and advanced digital signal processing capabilities, interference mitigation in the baseband level is common. Additional interference mitigation techniques include advance digital coding schemes common to many commercially available air-interface protocols (e.g., CDMA, 802.11 and LTE).

The interference mitigation of example embodiments may provide an ability to utilize either or both RF characteristics and baseband interference mitigation abilities that can be exercised within a real-time or near real-time implementation. Furthermore, if the characteristics of the interfering signal set can be determined (a priori or in-situ), example embodiments can be applied predictively.

Generally speaking, some example embodiments may provide a mitigation technique that takes advantage of the phase distribution (possibly also in addition to the amplitude distribution) of the antenna assembly 200 over the antenna aperture and the surrounding structures (including the aircraft frame). Phase information can be empirically determined (such as in an anechoic chamber) or through electromagnetic simulation of the antenna assembly 200 and the aircraft 150. Similar to conventional antenna radiation patterns, where the relative amplitude is presented for every position on a sphere encompassing the antenna (and aircraft), a phase distribution pattern can be generated to represent the relative phase shift for every position on the sphere.

In an example embodiment, a phase distribution pattern (e.g., a "radiated" phase distribution) may be determined for at least every position (i.e., every angle of arrival or location) on the orientation reference hemisphere 310 (and perhaps the orientation reference sphere 300). Thus, every angle of arrival has a corresponding phase transfer associated with that angle of arrival, and the phase distribution pattern associates the phase transfer at each angle of arrival (or reference location of origin on the orientation reference sphere 300, which provides a frame of reference to understand the angles of arrival in 3D space). This location specific, phase distribution pattern that is determined, may be referred to as a phase distribution map 320 (see FIGS. 6 and 7) since it maps the phase distribution pattern to each corresponding location or position on the orientation reference hemisphere 310 (or the orientation reference sphere 300). In some cases amplitude information may also be included in the phase distribution map or in another resource that can be accessed for such information. As a result, the relative amplitude and relative phase of a desired, intended signal and an interfering signal, which is dependent on the angle of arrival, can be compared to the phase distribution map 320 for normalization and further signal processing to cancel out the interfering signal. For rapidly moving aircraft, the angle of arrival, which changes with the aircraft's position and orientation (pitch, roll, yaw, etc.), may rapidly change. However, since the phase distribution map may already be known, the tracking of relative movement of the location of the interfering signal can also rapidly be normalized and canceled. Moreover, since each location of origin for the sphere has a corresponding phase distribution, it is possible, for signals that arrive with known phases, to determine the location of origin of the signals based on working backward from the known phase to the corresponding location of origin (i.e., angle of arrival in 3D space).

Figure 6:
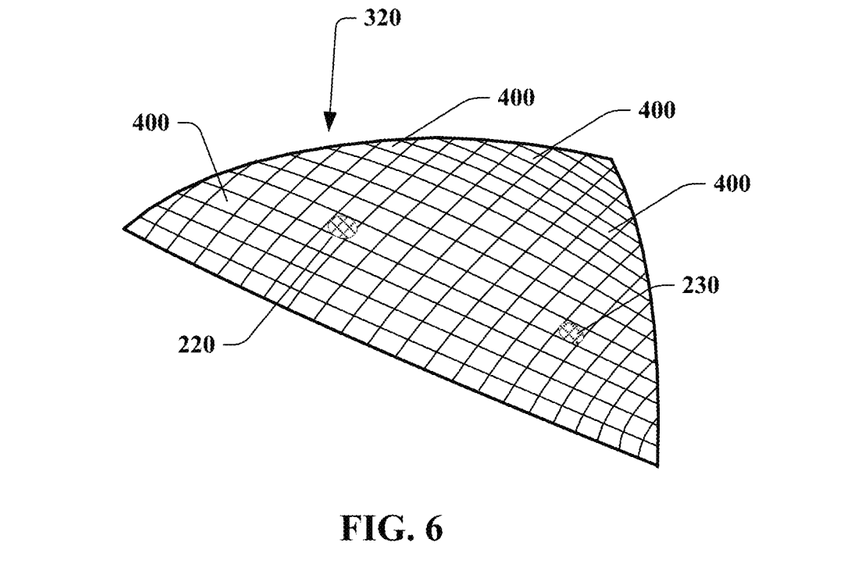
FIG. 6 illustrates a portion of a phase distribution map in accordance with an example embodiment.

As such, it should be appreciated that the additional consideration of relative phase information (which can be known for every location based on the phase distribution map 320), allows for the optimization of interference cancellation techniques in either or both the RF and baseband domains. FIG. 6 illustrates a depiction of a portion (or segment) of the orientation reference hemisphere 310 (or the orientation reference sphere 300). Referring to FIG. 6, the locations at which the desired signal 220 and interfering signal 230 intersect the orientation reference hemisphere 310 are shown. Additionally, a plurality of surface locations or locational regions 400 may be defined to indicate (e.g., using Cartesian coordinates, spherical coordinate, polar coordinates, cylindrical coordinates or any other suitable method) particular points on the orientation reference hemisphere 310 that correlate to corresponding angles of arrival relative to the antenna assembly 200. The phase distribution pattern of the antenna array 200 may be known for each locational region 400 to define the phase distribution map 320. Having the phase distribution map may then enable interference mitigation techniques to be utilized with knowledge of (and the ability to compensate for) the impacts (due to phase distribution) that can be expected on the interfering signal 230 based on its relative location (and therefore based on relative phase information). Cancellation of the interfering signal 230 can then be accomplished in real-time or near real-time, but such cancellation can also be very accurate.

Figure 7:
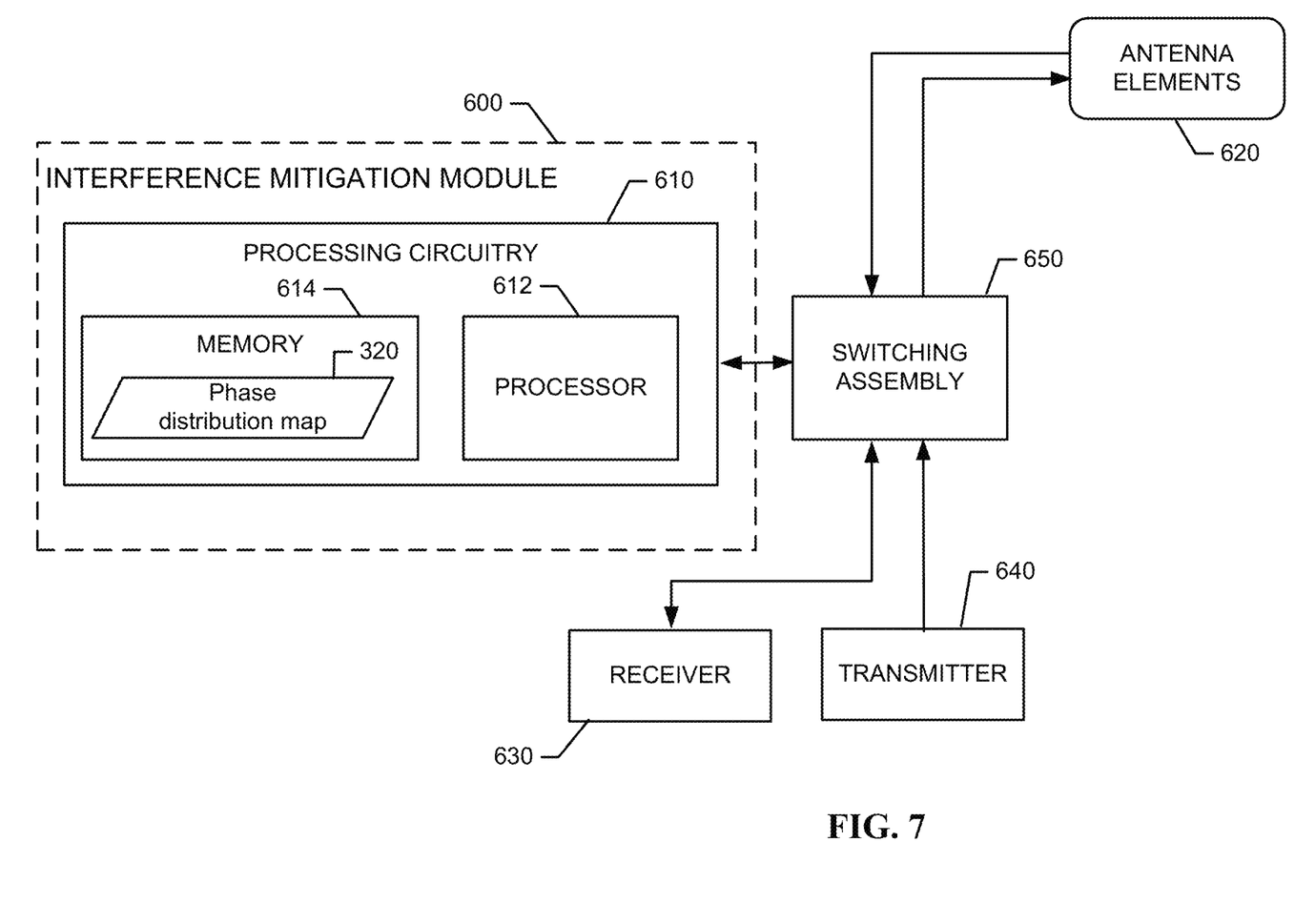
FIG. 7 illustrates a block diagram of an interference mitigation module according to an example embodiment.

FIG. 7 illustrates the architecture of an interference mitigation module 600 in accordance with an example embodiment. The interference mitigation module 600 may include processing circuitry 610 configured to provide control outputs for interference mitigation based on processing of various input information including relative phase information. The processing circuitry 610 may be configured to perform data processing, control function execution and/or other processing and management services according to an example embodiment of the present invention. In some embodiments, the processing circuitry 610 may be embodied as a chip or chip set. In other words, the processing circuitry 610 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 610 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 610 may include one or more instances of a processor 612 and memory 614. As such, the processing circuitry 610 may be embodied as a circuit chip (e.g., an integrated circuit chip) configured (e.g., with hardware, software or a combination of hardware and software) to perform operations described herein. However, in some embodiments, the processing circuitry 610 may be embodied as a portion of an on-board computer. In some embodiments, the processing circuitry 610 may communicate with various components, entities and/or sensors of the aircraft 150 and/or the ATG network 100.

The processor 612 may be embodied in a number of different ways. For example, the processor 612 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 612 may be configured to execute instructions stored in the memory 614 or otherwise accessible to the processor 612. As such, whether configured by hardware or by a combination of hardware and software, the processor 612 may represent an entity (e.g., physically embodied in circuitry—in the form of processing circuitry 610) capable of performing operations according to embodiments of the present invention while configured accordingly. Thus, for example, when the processor 612 is embodied as an ASIC, FPGA or the like, the processor 612 may be specifically configured hardware for conducting the operations described herein. Alternatively, as another example, when the processor 612 is embodied as an executor of software instructions, the instructions may specifically configure the processor 612 to perform the operations described herein.

In an example embodiment, the processor 612 (or the processing circuitry 610) may be embodied as, include or otherwise control the operation of the interference mitigation module 600 based on inputs received by the processing circuitry 610 responsive to receipt of position information associated with various relative positions of the communicating elements of the network, based on the relative locations (i.e., relative to the antenna assembly 200 or the aircraft 150, e.g., in the context of correlation to the orientation reference hemisphere 310) of signals received at the antenna assembly 200, and based on the phase distribution map 320. As such, in some embodiments, the processor 612 (or the processing circuitry 610) may be said to cause each of the operations described in connection with the interference mitigation module 600 in relation to adjustments to be made to cancel out interfering signals received at antenna elements 620 of the antenna assembly 200 to undertake the corresponding functionalities relating to interference mitigation responsive to execution of instructions or algorithms configuring the processor 612 (or processing circuitry 610) accordingly. In particular, the instructions may include instructions for processing 3D position information of a moving receiving station (e.g., on an aircraft) along with 2D position information of fixed transmission sites (i.e., base stations of the ATG network 100) in order to determine relative location to the desired signal 220. The instructions may also include instructions for determining a relative location of one or more instances of the interfering signal 230. These relative locations may then be used along with the phase distribution map 320 to normalize the received signal and, for every location other than the location of the desired signal 220, cancellation of the interfering signal 230 may occur by adding in a cancellation signal that is the inverse of the portions of the received signal that are not desired (i.e., the portions that correspond to interfering signals). Moreover, this process could be completed for a number of different received signals simultaneously, so that any number of received signals (and corresponding interfering signals) can be dealt with at different frequencies or locations of origin. As noted above, this cancellation can be accomplished in the RF domain (e.g., using phase shifters and combiners) or in the baseband domain (e.g., using digital signal processing).

In an exemplary embodiment, the memory 614 may include one or more non-transitory memory devices such as, for example, volatile and/or non-volatile memory that may be either fixed or removable. The memory 614 may be configured to store information, data, applications, instructions or the like for enabling the processing circuitry 610 to carry out various functions in accordance with exemplary embodiments of the present invention. For example, the memory 614 could be configured to buffer input data for processing by the processor 612. Additionally or alternatively, the memory 614 could be configured to store instructions for execution by the processor 612. As yet another alternative, the memory 614 may include one or more databases that may store a variety of data sets responsive to input sensors and components. Among the contents of the memory 614, applications and/or instructions may be stored for execution by the processor 612 in order to carry out the functionality associated with each respective application/instruction. In some cases, the applications may include instructions for providing inputs to control operation of the interference mitigation module 600 as described herein.

In an example embodiment, the memory 614 may store fixed position information indicative of a fixed geographic location of at least one base station. In some embodiments, the fixed position information may be indicative of the fixed geographic location of a single base station of the ATG network 100. However, in other embodiments, the fixed position information may be indicative of the fixed geographic location of multiple ones (or even all) of the base stations of the ATG network 100. In other embodiments, the fixed position information may be stored at another memory device either onboard the aircraft 150 or accessible to the network controller 160. However, regardless of the storage location of the fixed position information, such information may be read out of memory and provided to (and therefore also received at) the processing circuitry 610 for processing in accordance with an example embodiment to determine a relative location of the desired signal 220 based on knowing the fixed position information along with dynamic position information indicative of the 3D location of the aircraft 150. However, it should be appreciated that the relative location of the desired signal 220 could also be determined in other ways. Moreover, the relative location could be provided to the processing circuitry 610 from another component, or could be determined based on tracking beacon signals or any other known method in the art.

As shown in FIG. 7, the interference mitigation module 600 may be operably coupled to components of the antenna assembly 200 and/or radio circuitry of the aircraft 150 directly or indirectly in order to perform the interference mitigation techniques described herein. Thus, for example, one or more antenna elements 620 may be operably coupled to a receiver 630 and/or transmitter 640 of radio equipment on the aircraft 150. In some examples, various components of a switching assembly 650 may be interposed between the antenna elements 620 and the receiver 630 and transmitter 640. The switching assembly 650 may include, for example, a combiner, which may be operably coupled to a multi-pole throw switch that may further be operably coupled to a circulator. The circulator may isolate signals among various ports to provide a high degree of port-to-port isolation with a relatively low insertion loss. The circulator may be operably coupled to a receive filter of the receiver 630 via a low noise amplifier (LNA) and a switch. The circulator may also be operably coupled to transmitter circuitry of the transmitter 640 through a switch, a cavity filter and/or a power amplifier.

In some embodiments, regardless of where the interference mitigation module 600 is instantiated, the interference mitigation module 600 may be configured to provide the interference mitigation techniques described herein. As such, although FIG. 7 shows the interference mitigation module 600 being in communication with the switching assembly 650, it should be appreciated that the interference mitigation module 600 could alternatively be part of the switching assembly 650 or be located anywhere along the chain of elements that lead to or are part of the receiver 630. Thus, the interference mitigation module 600 could be instantiated between the switching assembly 650 and the receiver 630, or could be part of the receiver 630 or otherwise operably coupled to the receiver 630.

Figure 8:
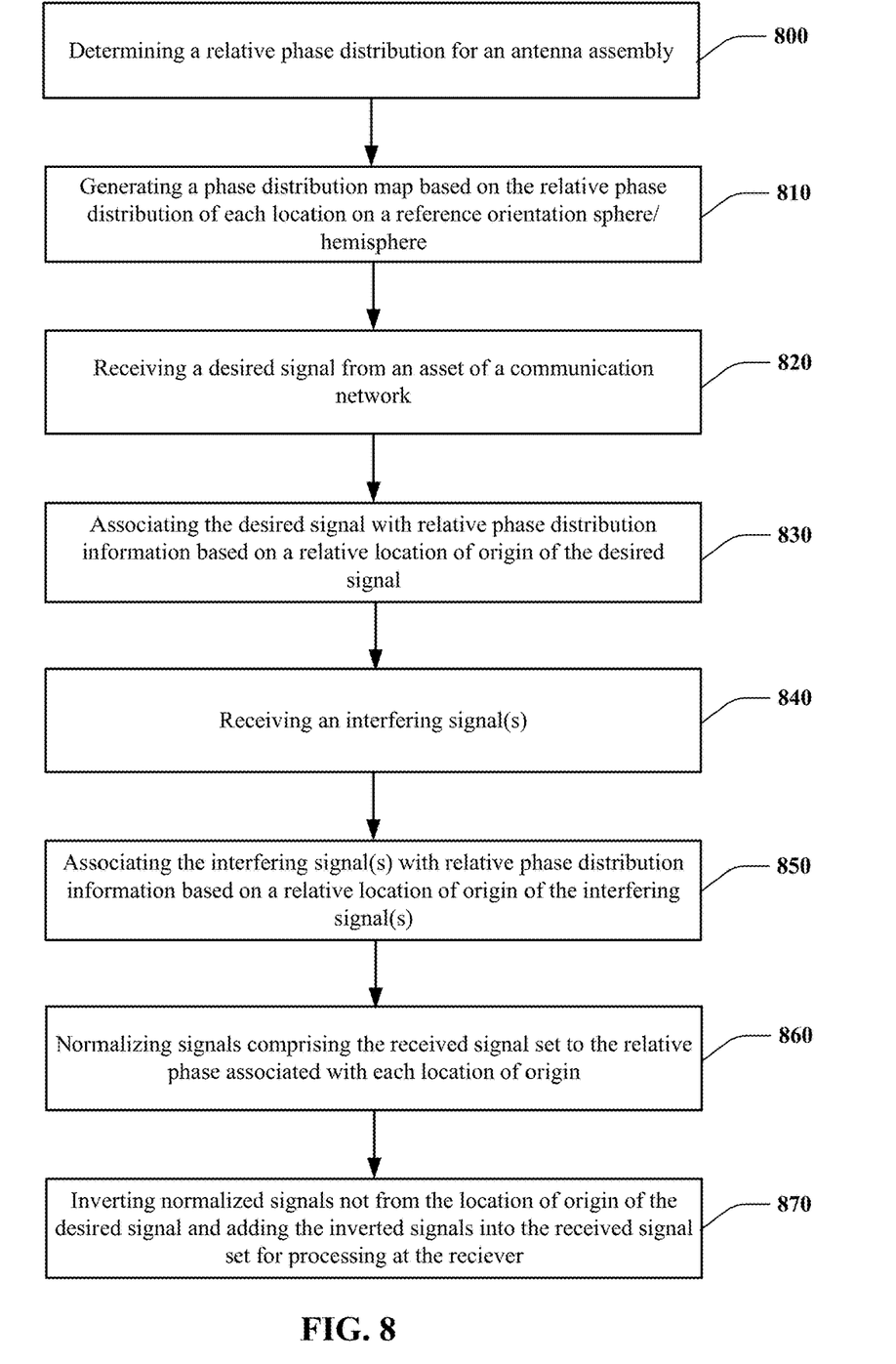
FIG. 8 illustrates a block diagram of a method of performing interference mitigation in accordance with an example embodiment.

FIG. 8 illustrates a block diagram of one method that may be associated with the system of interference mitigation module 600 of FIG. 7. From a technical perspective, the interference mitigation module 600 described above may be used to support some or all of the operations described in FIG. 8. As such, the platform described in FIG. 7 may be used to facilitate the implementation of several computer program, antenna assembly and/or network communication based interactions. As an example, FIG. 8 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an entity or apparatus (e.g., the interference mitigation module 600) and executed by a processor in the entity or apparatus. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 8, may include determining a relative phase distribution for an antenna assembly at operation 800. In some cases the relative phase distribution determination may also be accompanied by a determination of a relative amplitude distribution for the antenna assembly. The relative amplitude distribution (if employed) may be determined according to known techniques in the art. For a generic antenna assembly, the determined relative phase distribution may be determined for the orientation reference sphere 300 as described above. However, if the antenna assembly is on an aircraft (although a full view around the aircraft is possible), the relative phase distribution may instead be determined for the orientation reference hemisphere 310. In an example embodiment, the determined relative phase distribution may be used to generate a phase distribution map at optional operation 810.

Of note, the operations 800 and 810 may be performed prior to execution of remaining operations described herein. As such, for real-time (or near real-time) execution of interference mitigation, the method may only include operations 820 to 870. Operation 820 may include receiving a desired signal (i.e., a signal intended for the asset associated with the receiver receiving the desired signal) from a base station of an ATG (or other communication) network. The desired signal may then be associated with relative phase distribution information (and perhaps also relative amplitude information) based on a relative location of origin of the desired signal (e.g., based on the phase distribution map) at operation 830. The desired signal may, in some cases, be determinable since the desired signal is detected from a relative location at which the base station is known to be located. The method may further include receiving one or more other signals (i.e., interfering signals or not-desired signals) at operation 840 and associating the interfering signal(s) with relative phase distribution information (and perhaps also relative amplitude information) based on a relative location of origin of the interfering signal(s) (e.g., based on the phase distribution map) at operation 850. The desired signal and the interfering signal(s) may collectively be referred to as a received signal set.

The method may then include normalization of signals comprising the received signal set to the relative phase (and perhaps also amplitude) associated with each location of origin at operation 860. Normalized signals from the received signal set that are not from a location associated with the location of origin of the desired signal are identified and an inverted signal associated with each one is then added to the received signal set at operation 870. The resulting signal set includes all signals from the received signal set and the inverted signals, which cancels (or partially cancels) each corresponding interfering signal. Thus, the receiver 630 effectively processes only (or primarily) the desired signal.

As previously mentioned, the normalization, inversion, and addition processes can be realized in the RF domain (using phase shifters and combiners), the baseband domain (using manipulation of the I and Q components of the signal), or a combination of both. It should also be noted that "pointing" in the directions can be realized by the physical selection of individual antenna elements, the implementation of beam steering techniques, or by digital beam forming techniques. In each of these techniques, the relative amplitude and phase distribution is known over a desired frequency range of operation.

In another embodiment, signal processing techniques can be applied to a received signal set to identify and isolate specific interferer signals from desired signals based on signal characteristics. For example, the received waveform of a desired signal can have the characteristics of an LTE signal while the waveform of an interfering signal can be WLAN (802.11). These waveforms can be identified using digital signal processing (DSP) techniques. Knowledge of the waveforms may enable the incorporation of waveform-specific cancellation techniques. For example, if a handover location can be anticipated for a specific base station, it may be possible to estimate the relative location of origin of the "new" desired signal (i.e., the desired signal after handover) at the point at which handover is completed. It may also be possible to project (e.g., based on determining a location of an interfering signal's source) where the interfering signal will be (on the orientation reference sphere or hemisphere) and apply normalization and inversion as described above preemptively on any signals not located at the location of origin of the desired signal (but instead at projected interfering signal locations).

In another embodiment, knowledge of a received signal's relative phase changes over time can be correlated to changes in aircraft position and orientation to determine the direction and general location of desired and interfering signals. This information can be used to optimize system performance (enhancing beam selection positions) as well as to establish a predictive cancellation technique.

In accordance with an example embodiment, an interference mitigation module may be provided. The module may include processing circuitry configured to receive a desired signal from an asset of the system at an antenna assembly and associate the desired signal with relative phase distribution information based on a relative location of origin of the desired signal where the relative phase distribution information is predetermined for the antenna assembly. The processing circuitry may be further configured to receive an interfering signal and associate the interfering signal with relative phase distribution information based on a relative location of origin of the interfering signal where the desired signal and the interfering signal forming a received signal set. The processing circuitry may be further configured to normalize signals of the received signal set to respective relative phases associated with each respective relative location of origin, and perform interference cancellation of the interfering signal based on the normalized signals.

In some embodiments, the module (and corresponding method the module may be configured to perform) may be configured to perform (or include) additional, optional operations, and/or the operations described above may be modified or augmented. Some examples of modifications, optional operations and augmentations are described below. It should be appreciated that the modifications, optional operations and augmentations may each be added alone, or they may be added cumulatively in any desirable combination. In an example embodiment, performing interference cancellation may include inverting normalized signals not from the relative location of origin of the desired signal and adding the inverted normalized signals into the received signal set for processing at a receiver associated with the antenna assembly. In an example embodiment, the processing circuitry may be further configured to perform an initial operation of determining a relative phase distribution for the antenna assembly to define the relative phase distribution information, and generating a phase distribution map based on the relative phase distribution for each location on an orientation reference sphere or hemisphere. In an example embodiment, associating the desired signal with relative phase distribution information and associating the interfering signal with relative phase distribution information are each performed based on the phase distribution map. In an example embodiment, associating the desired signal with relative phase distribution information further includes associating the desired signal with relative amplitude distribution information based on the relative location of origin of the desired signal, and associating the interfering signal with relative phase distribution information further includes associating the interfering signal with relative amplitude distribution information based on the relative location of origin of the interfering signal. In an example embodiment, the relative amplitude distribution information based on the relative location of origin of the desired signal, and the relative amplitude distribution information based on the relative location of origin of the interfering signal are each obtained from the phase distribution map. In an example embodiment, performing interference cancellation may include applying a cancellation signal corresponding to portions of the received signal set not from the relative location of origin of the desired signal in the radio frequency (RF) domain. Alternatively or additionally, performing interference cancellation may include applying a cancellation signal corresponding to portions of the received signal set not from the relative location of origin of the desired signal in the baseband domain. In an example embodiment, associating the desired signal with relative phase distribution information may include determining the relative location of origin of the desired signal with respect to a locational region on an orientation reference sphere in a context in which the locational region has a known phase distribution pattern. In an example embodiment, associating the desired signal with relative phase distribution information may include determining the relative location of origin of the desired signal with respect to a locational region on an orientation reference hemisphere in a context in which the locational region has a known phase distribution pattern Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for interference mitigation in a wireless communication system, the method comprising:
   determining a relative phase distribution for the antenna assembly of the wireless communication system to define relative phase distribution information for the antenna assembly;
   generating a phase distribution map for the antenna assembly based on the relative phase distribution for each location on an orientation reference sphere or hemisphere; and
   employing the phase distribution map to perform interference cancellation for the antenna assembly.

2. The method of claim 1, wherein employing the phase distribution map to perform interference cancellation comprises:
   receiving a desired signal from an asset of the system at the antenna assembly;
   associating the desired signal with relative phase distribution information based on a relative location of origin of the desired signal using the phase distribution map;
   receiving an interfering signal;
   associating the interfering signal with relative phase distribution information based on a relative location of origin of the interfering signal, the desired signal and the interfering signal forming a received signal set;
   normalizing signals of the received signal set to respective relative phases associated with each respective relative location of origin; and
   cancelling the interfering signal based on the normalized signals.

3. The method of claim 2, wherein performing interference cancellation comprises inverting normalized signals not from the relative location of origin of the desired signal and adding the inverted normalized signals into the received signal set for processing at a receiver associated with the antenna assembly.

4. The method of claim 3, wherein associating the desired signal with relative phase distribution information and associating the interfering signal with relative phase distribution information are each performed based on the phase distribution map.

5. The method of claim 3, wherein associating the desired signal with relative phase distribution information further comprises associating the desired signal with relative amplitude distribution information based on the relative location of origin of the desired signal, and
   wherein associating the interfering signal with relative phase distribution information further comprises associating the interfering signal with relative amplitude distribution information based on the relative location of origin of the interfering signal.

6. The method of claim 5, wherein the relative amplitude distribution information based on the relative location of origin of the desired signal, and the relative amplitude distribution information based on the relative location of origin of the interfering signal are each obtained from the phase distribution map.

7. The method of claim 2, wherein cancelling the interfering signal comprises applying a cancellation signal corresponding to portions of the received signal set not from the relative location of origin of the desired signal in the radio frequency (RF) domain.

8. The method of claim 2, wherein cancelling the interfering signal comprises applying a cancellation signal corresponding to portions of the received signal set not from the relative location of origin of the desired signal in the baseband domain.

9. The method of claim 2, wherein associating the desired signal with relative phase distribution information comprises determining the relative location of origin of the desired signal with respect to a locational region on an orientation reference sphere, wherein the locational region has a known phase distribution pattern.

10. The method of claim 2, wherein associating the desired signal with relative phase distribution information comprises determining the relative location of origin of the desired signal with respect to a locational region on an orientation reference hemisphere, wherein the locational region has a known phase distribution pattern.

11. An interference mitigation module comprising processing circuitry configured to:
    determine a relative phase distribution for the antenna assembly of the wireless communication system to define relative phase distribution information for the antenna assembly;
    generate a phase distribution map for the antenna assembly based on the relative phase distribution for each location on an orientation reference sphere or hemisphere; and
    employ the phase distribution map to perform interference cancellation for the antenna assembly.

12. The module of claim 11, wherein employing the phase distribution map to perform interference cancellation comprises the processing circuitry being configured to:
    receive a desired signal from an asset of the system at the antenna assembly;
    associate the desired signal with relative phase distribution information based on a relative location of origin of the desired signal using the phase distribution map;
    receive an interfering signal;
    associate the interfering signal with relative phase distribution information based on a relative location of origin of the interfering signal, the desired signal and the interfering signal forming a received signal set;

normalize signals of the received signal set to respective relative phases associated with each respective relative location of origin; and cancel the interfering signal based on the normalized signals.

13. The interference mitigation module of claim 12, wherein performing interference cancellation comprises inverting normalized signals not from the relative location of origin of the desired signal and adding the inverted normalized signals into the received signal set for processing at a receiver associated with the antenna assembly.

14. The interference mitigation module of claim 13, wherein associating the desired signal with relative phase distribution information and associating the interfering signal with relative phase distribution information are each performed based on the phase distribution map.

15. The interference mitigation module of claim 13, wherein associating the desired signal with relative phase distribution information further comprises associating the desired signal with relative amplitude distribution information based on the relative location of origin of the desired signal, and wherein associating the interfering signal with relative phase distribution information further comprises associating the interfering signal with relative amplitude distribution information based on the relative location of origin of the interfering signal.

16. The interference mitigation module of claim 15, wherein the relative amplitude distribution information based on the relative location of origin of the desired signal, and the relative amplitude distribution information based on the relative location of origin of the interfering signal are each obtained from the phase distribution map.

17. The interference mitigation module of claim 12, wherein cancelling the interfering signal comprises applying a cancellation signal corresponding to portions of the received signal set not from the relative location of origin of the desired signal in the radio frequency (RF) domain.

18. The interference mitigation module of claim 12, wherein cancelling the interfering signal comprises applying a cancellation signal corresponding to portions of the received signal set not from the relative location of origin of the desired signal in the baseband domain.

19. The interference mitigation module of claim 12, wherein associating the desired signal with relative phase distribution information comprises determining the relative location of origin of the desired signal with respect to a locational region on an orientation reference sphere, wherein the locational region has a known phase distribution pattern.

20. The interference mitigation module of claim 12, wherein associating the desired signal with relative phase distribution information comprises determining the relative location of origin of the desired signal with respect to a locational region on an orientation reference hemisphere, wherein the locational region has a known phase distribution pattern.

* * * * *